(12) United States Patent
Johnson et al.

(10) Patent No.: US 6,629,551 B1
(45) Date of Patent: Oct. 7, 2003

(54) BEADLESS WELDING APPARATUS COMPRISING A WELD HEAD HAVING A BIAS MEMBER FOR AXIAL DISPLACEMENT

(75) Inventors: Michael W. Johnson, St. Louis Park, MN (US); Jeffrey J. McKenzie, Watertown, MN (US)

(73) Assignee: Entegris, Inc., Chaska, MN (US)

( * ) Notice: Subject to any disclaimer, the term of this patent is extended or adjusted under 35 U.S.C. 154(b) by 0 days.

(21) Appl. No.: 09/528,402

(22) Filed: Mar. 20, 2000

Related U.S. Application Data

(63) Continuation-in-part of application No. 09/295,103, filed on Apr. 18, 1999.

(51) Int. Cl.$^7$ ................................................ B29C 65/02
(52) U.S. Cl. .................. 156/503; 156/304.2; 156/304.6
(58) Field of Search .............................. 156/503, 304.2, 156/304.6

(56) References Cited

U.S. PATENT DOCUMENTS

| | | | |
|---|---|---|---|
| 2,470,854 A | 5/1949 | Kovac | 219/221 |
| 3,002,871 A | 10/1961 | Tramm et al. | |
| 3,013,925 A | 12/1961 | Larsen | |
| 3,022,209 A | 2/1962 | Campbell | |
| 3,276,941 A | 10/1966 | Burns | 428/60 |
| 3,353,005 A | 11/1967 | Sisson et al. | 219/411 |
| 3,727,289 A | 4/1973 | Bemelmann et al. | 29/237 |
| 3,729,360 A | 4/1973 | McElroy | |
| 3,804,691 A | 4/1974 | Trivedi | 156/275.1 |
| 3,865,662 A | 2/1975 | Segal | 156/94 |
| 4,092,193 A | 5/1978 | Brooks | 156/83 |
| 4,205,221 A | 5/1980 | Meyer | 219/230 |
| 4,207,456 A | 6/1980 | Best | 392/433 |
| 4,228,941 A | 10/1980 | Persson | 228/107 |
| 4,398,879 A | 8/1983 | DuPont et al. | 425/392 |
| 4,419,095 A | 12/1983 | Nebergall et al. | 604/103.1 |
| 4,465,220 A | 8/1984 | Ledlow et al. | 228/50 |
| 4,536,644 A | 8/1985 | Thalmann | 156/174 |
| 4,626,658 A | 12/1986 | Gray et al. | 219/230 |
| 4,632,292 A | 12/1986 | Gnyra | 228/2.5 |

(List continued on next page.)

FOREIGN PATENT DOCUMENTS

| | | | | |
|---|---|---|---|---|
| DE | 2332174 | | 1/1975 | |
| EP | 0406876 | | 7/1990 | |
| GB | 2048413 | | 3/1980 | |
| GB | 2048413 | | 12/1980 | |
| WO | WO 98/33639 | * | 8/1998 | B29C/65/14 |

*Primary Examiner*—Michael W. Ball
*Assistant Examiner*—Todd J. Kilkenny
(74) *Attorney, Agent, or Firm*—Patterson, Thuente, Skaar & Christensen

(57) ABSTRACT

A conduction welding apparatus and method for bonding abutted thermal plastic tubular end portions is particularly suitable for welding PFA. In a preferred embodiment, a folding weld head embraces the abutted the tubular end portions to be welded, each tubular end portion including a flange spaced from the surfaces to be joined. The weld head includes means for securing the flanges within the weld head and further include bias means. The bias means provide an inward axial bias on the adjoined tubular end portions when the tubular end portions are displaced axially outward from the weld head due to the expansion of the plastic during the weld process. The bias means in a preferred embodiment is substantially inoperative prior to the weld and provides bias, or a substantial increase in bias, when the flanges are displaced due to the expansion of the molten PFA during the weld process. In a preferred embodiment, the securing means comprises a pair of clamps which each attach to and encompass the respective tubular end portions at the end portion flanges. The tubing clamps fit into recesses in the weld head. In such a preferred embodiment the bias means is provided by a spring loaded plate which is deflectable in an axial direction outward from the weld head. The invention also includes a process for accomplishing a weld with the described apparatus.

6 Claims, 8 Drawing Sheets

U.S. PATENT DOCUMENTS

| | | | |
|---|---|---|---|
| 4,674,772 A | 6/1987 | Lycan | 285/288.11 |
| 4,714,513 A | 12/1987 | McAlister | |
| 4,792,374 A | 12/1988 | Rianda | 156/503 |
| 4,801,349 A | 1/1989 | Dommer et al. | 156/503 |
| 4,927,642 A | 5/1990 | Kunz | 156/158 |
| 4,927,999 A | 5/1990 | Hanselka | 156/156 |
| 4,929,293 A | 5/1990 | Osgar | 156/158 |
| 4,954,206 A | 9/1990 | Voss | |
| 4,969,972 A | 11/1990 | Kunz | 156/503 |
| 4,990,296 A | 2/1991 | Pitolaj | |
| 5,037,500 A | 8/1991 | Hilpert | 156/503 |
| 5,090,608 A | 2/1992 | Jones | 228/49.3 |
| 5,107,095 A | 4/1992 | Derbyshire | 219/230 |
| 5,124,533 A | 6/1992 | Dommer et al. | 156/704.6 |
| 5,142,776 A | 9/1992 | Neely | |
| 5,176,411 A | 1/1993 | DuPont, Jr. | 285/249 |
| 5,183,524 A | 2/1993 | Dommer et al. | |
| 5,226,995 A | 7/1993 | White | 156/158 |
| 5,259,901 A | 11/1993 | Davis et al. | 156/154 |
| 5,290,387 A | 3/1994 | Kramer et al. | 156/359 |
| 5,306,377 A | 4/1994 | Jensen et al. | 156/304.2 |
| 5,352,871 A | 10/1994 | Ross et al. | 156/272.4 |
| 5,431,762 A | 7/1995 | Blomqvist | |
| 5,439,529 A | 8/1995 | Vernon et al. | |
| 5,484,506 A | 1/1996 | DuPont et al. | 156/503 |
| 5,527,406 A | 6/1996 | Brath | 156/64 |
| 5,733,400 A | 3/1998 | Gore et al. | 156/158 |
| 5,814,181 A | 9/1998 | Richter et al. | 156/351 |

\* cited by examiner

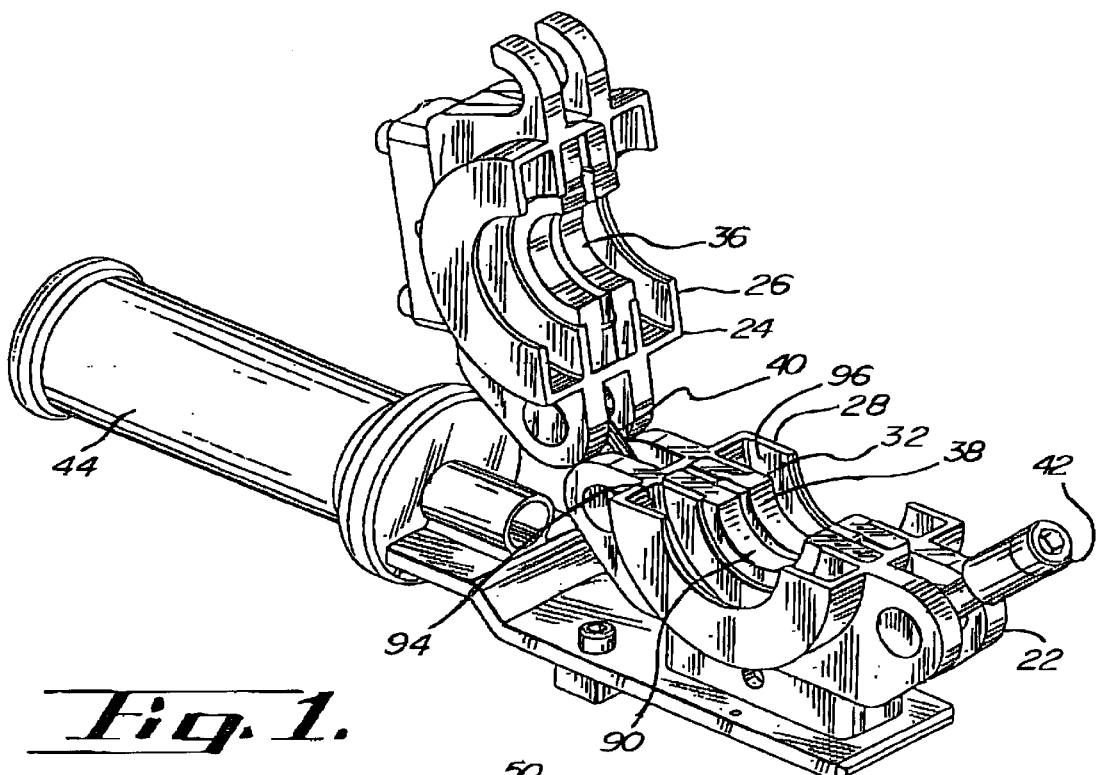
Fig. 1.
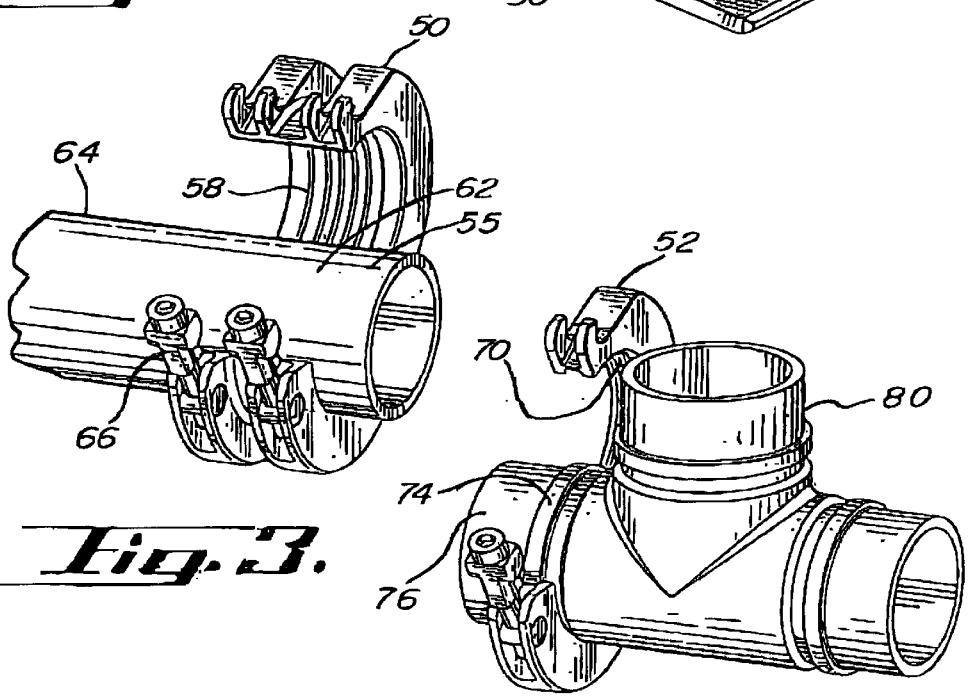
Fig. 3.
Fig. 4.

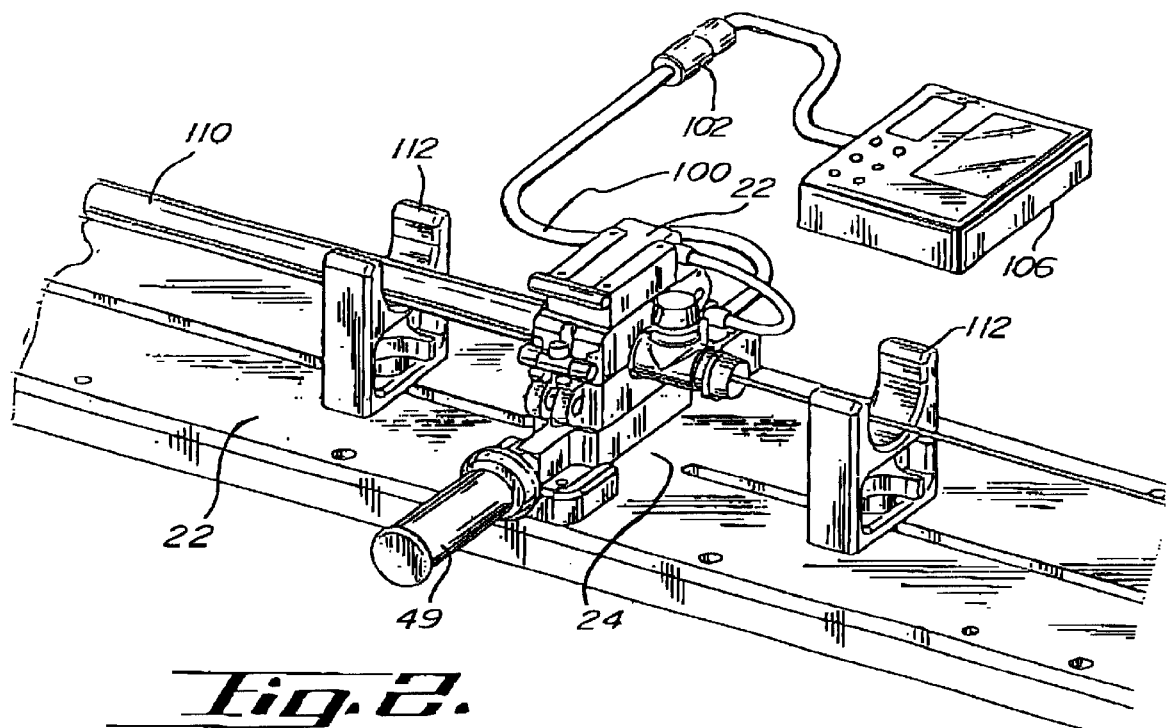
_Fig. 2._
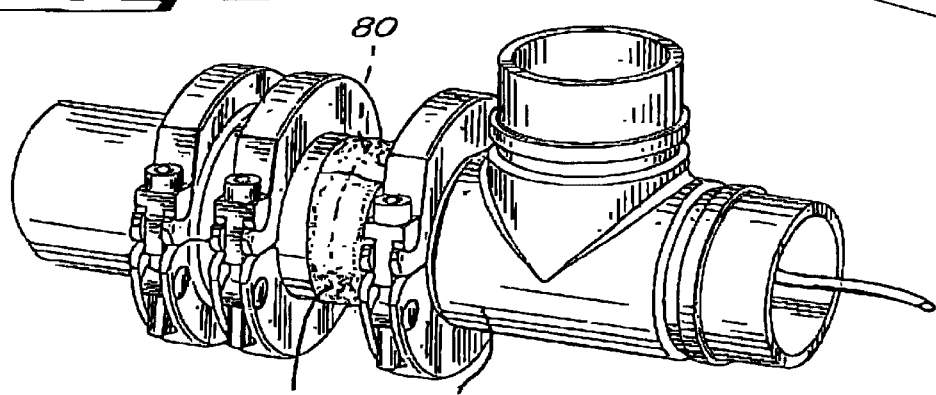
_Fig. 5._
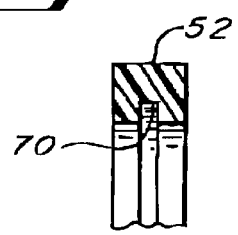
_Fig. 3b._
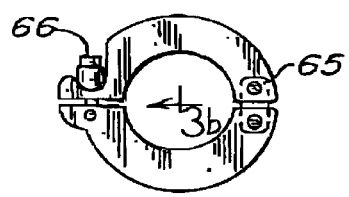
_Fig. 3a._

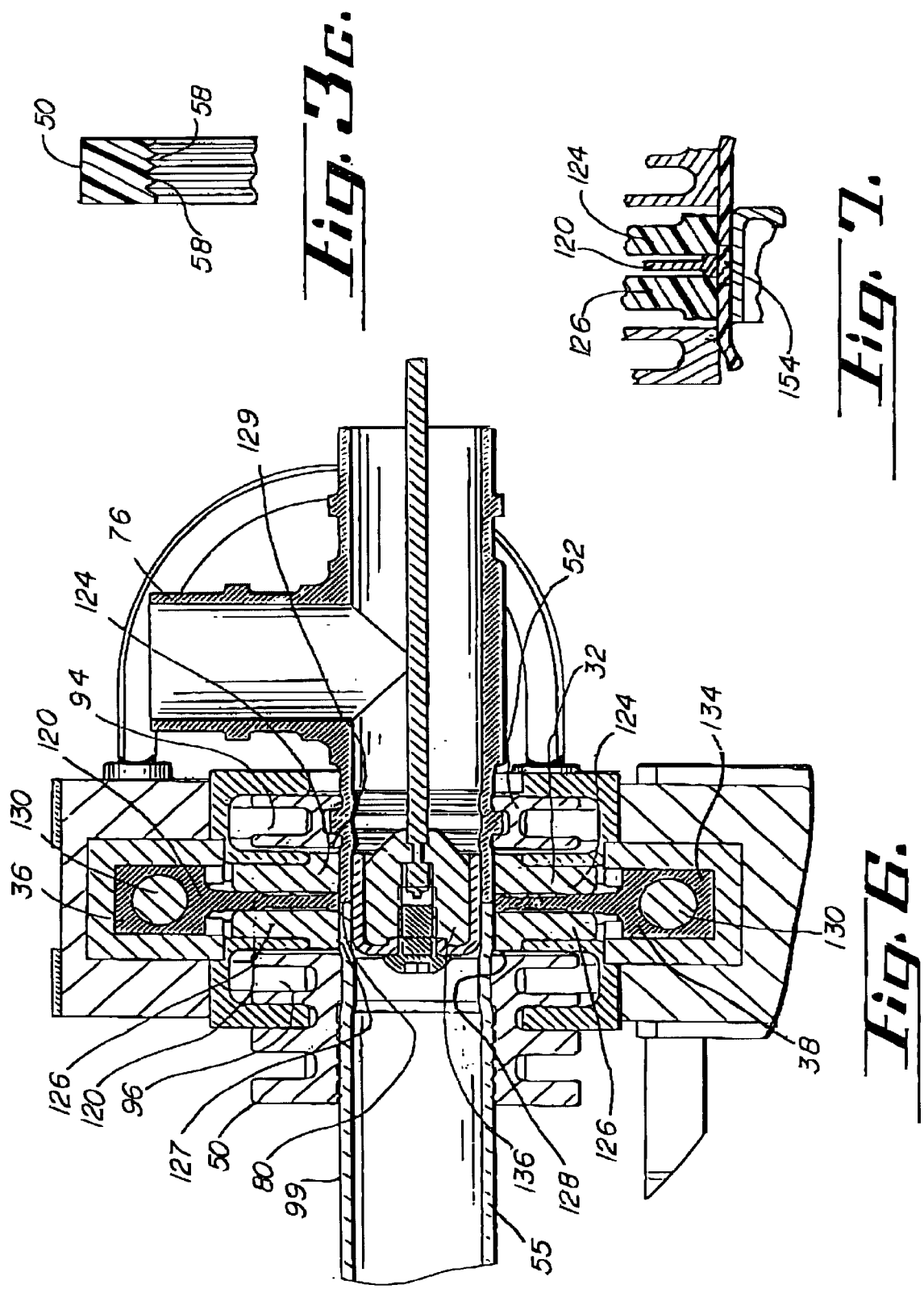

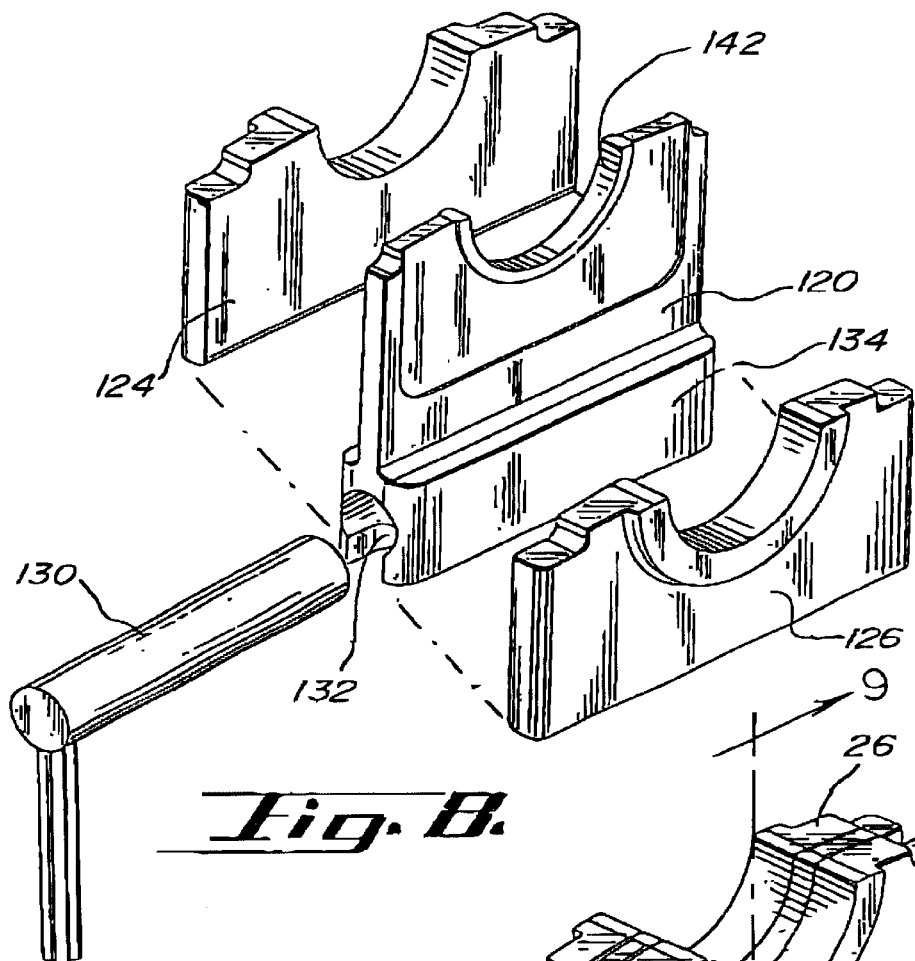
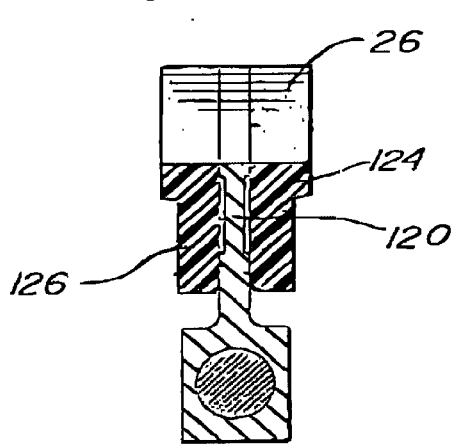
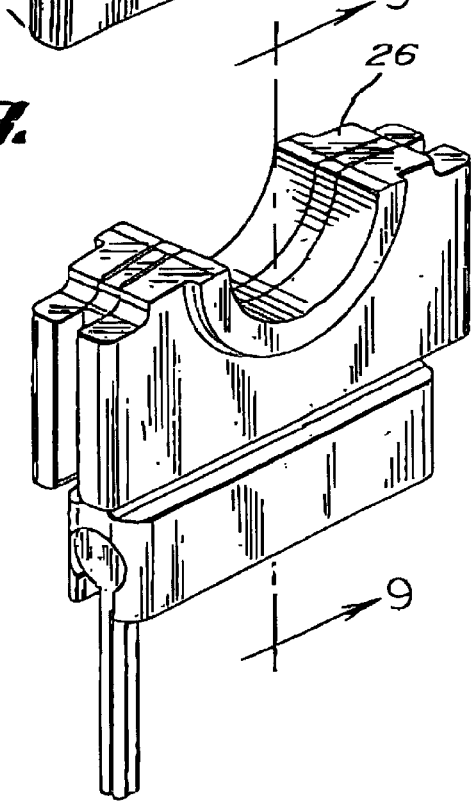
Fig. 8.
Fig. 9.
Fig. 8a.

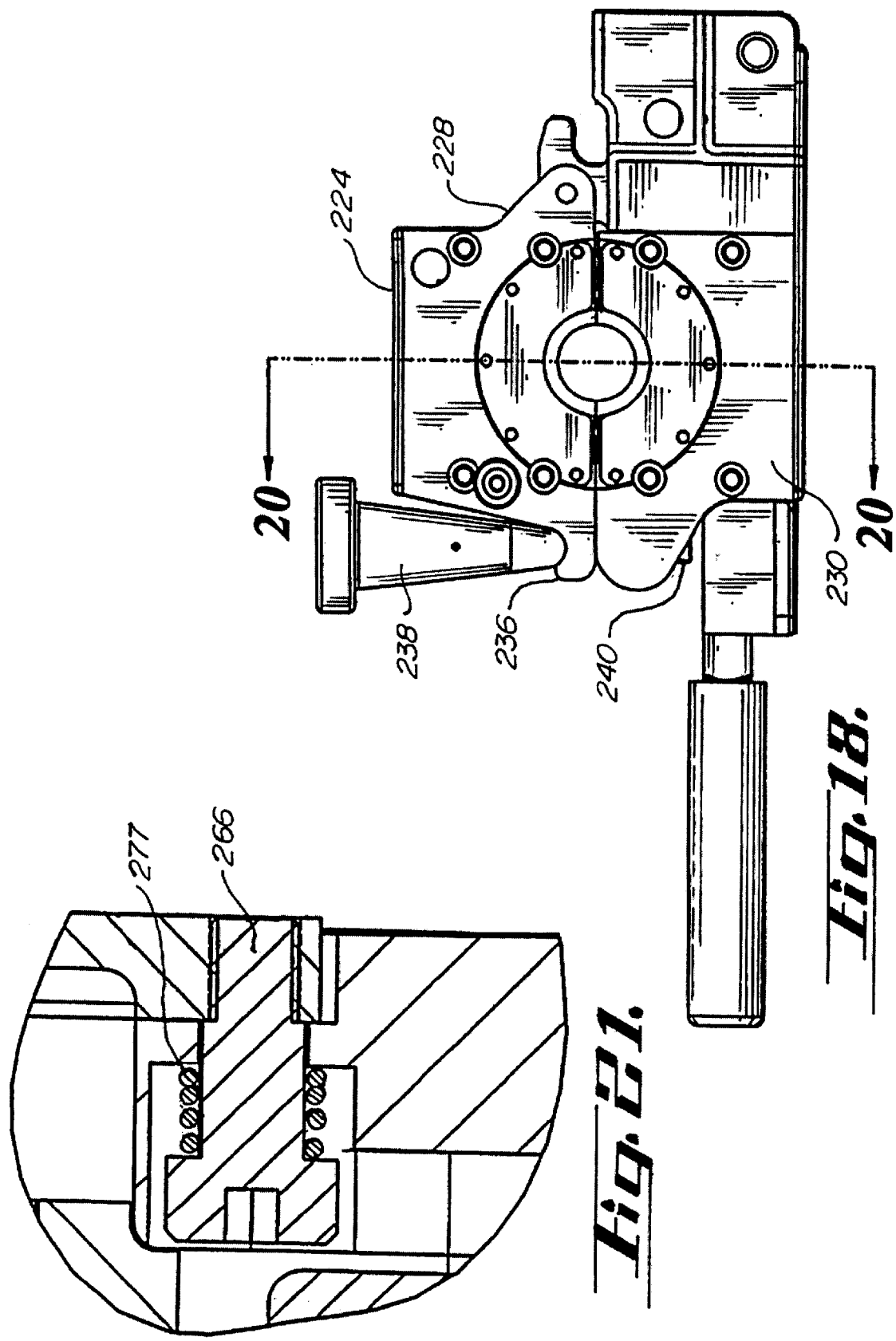

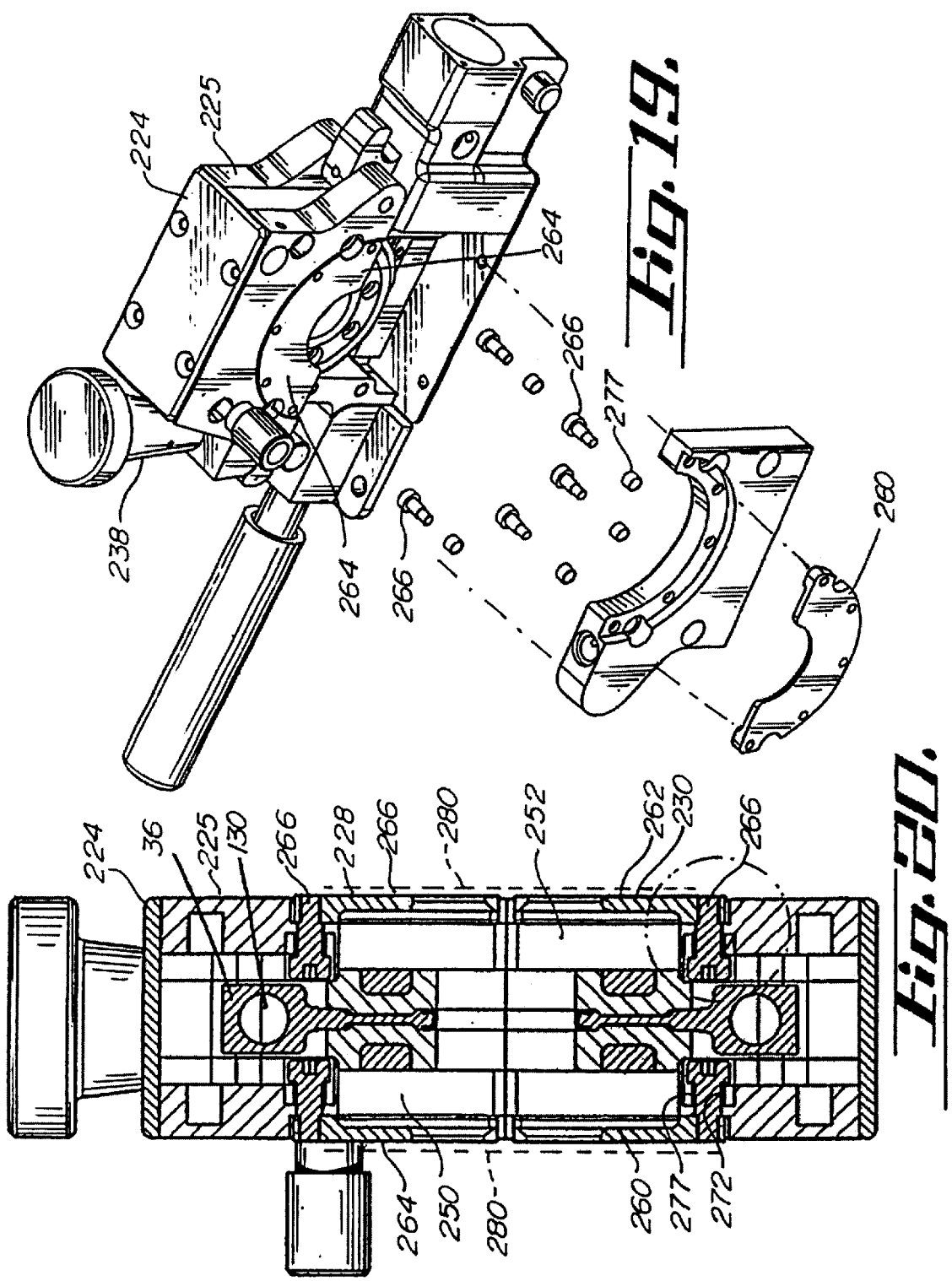

BEADLESS WELDING APPARATUS COMPRISING A WELD HEAD HAVING A BIAS MEMBER FOR AXIAL DISPLACEMENT

This is a Continuation-in-Part of application Ser. No. 09/295,103 filed Apr. 18, 1999, still pending.

CROSS-REFERENCE TO RELATED APPLICATIONS

This application is also related to application Ser. No. 09/295,102 filed on the same date as this application, entitled "Insert for Use in Conjoining Tubular End Portion," by Michael W. Johnson and Jeffrey J. McKenzie. These applications are incorporated by reference herein.

BACKGROUND OF THE INVENTION

This invention relates to an apparatus and method for welding thermoplastic tubular end portions. More particularly the invention relates to an apparatus and method particularly suitable for welding PFA (perfluoroalkoxy).

Various means have been known for welding together the ends of thermoplastic pipes or tubes. U.S. Pat. No. 3,013,925 discloses inserting a heated platen between the ends of lined pipes and causing the pipes to bear against the heated platen to fuse the plastic after which, the platen is removed and the pipes are pressed together under pressure until welding has occurred and the thermoplastic material hardens as it cools. U.S. Pat. Nos. 5,037,500; 4,792,374; and 5,484,506 all disclose exterior conduction heaters in which abutted tubular ends are peripherally heated to weld the ends together.

U.S. Pat. No. 4,929,293 to Osgar utilizes the placement of an infrared heating plate in-between and not contacting the tubular end pieces to be joined. The infrared heating plate is removed and the tube joints are then engaged together to create the weld. Although such a procedure provides a high integrity weld on PFA and other melt processable plastics, such a weld typically leaves a deformation or a bead on the inner and/or outer surfaces of the joined tubular end portions.

In many applications it is unacceptable to have any deformations in the joined tube particularly on the interior surface. In sanitary systems used in the food processing and pharmaceutical industries the standards of the U.S. Code of Regulations, 7 C.F.R. ?58.128 require a conduit be smooth, permit laminar flow of fluids and be free of discontinuities that could trap particulate matter.

Traditionally, stainless steel tubing and pipe have been used in sanitary systems. However, due to corrosion, expense and other problems, plastic pipe and tubing are now seeing more use in such systems and PFA has the particular advantages of its high chemical inertness and resistance to the high temperature cleaning and sanitizing temperatures.

Applicants are not aware of any conduction heat weld system that has peripheral contact with abutted tubular ends has been shown to be suitable for welding PFA. This is due to the difficulties associated with the higher melt temperatures of PFA (approximately 590 F.) and the characteristics of PFA. For example, melted PFA sticks to many different materials that are commonly used in welding devices. Such sticking can render the completed weld defective and can cause significant operational problems with the weld equipment. Additionally, heating and melting of PFA produces fluorine gas which is highly corrosive to conventional materials utilized in fusion welding equipment. For example standard stainless steel quickly pits when exposed to fluorine gas. Additionally, PFA when melted expands and if constrained can develop extremely high pressures causing the PFA to leach out of the weld are into crevices or other undesired locations.

Also problematic with welding higher temperature melt processable plastics, such as PFA, is the extended cycle time for a weld. The typical generic steps for a weld are: 1) position the tubular end portions to be welded in the weld head; 2) close the weld head; 3) warm up the weld head and heater portion; 4) melt and weld the end portions; and 5) allow the welded part to cool; and 6) remove the welded component from the weld head. Conventional conduction heating heads utilize a pair of integral heater portions each of which extend longitudinally down the abutted tubular end portions and totally enclose the melt portion of the end portions. Such conventional weld portions are formed of stainless steel which has a relatively high thermal conductivity. This makes it difficult to isolate and minimize the melt zone which in turn effects the length of the cycle time. Moreover, in conventional weld beads and weld apparatus essentially all of the components are made of metal. This increases the warm-up period and the cool down period. With the elevated temperatures associated with PFA, these problems are exacerbated.

Attempts have been made to reduce the cycle time of welding thermoplastic tubular end portions such as by providing heat sink arrangements and forced cooling. The high thermal conductivity of metals and particularly stainless steel minimizes the effectiveness of such measures and ancillary cooling equipment adds cost, complexity, and maintenance problems.

A welding apparatus, system, and methodology is needed for creating beadless welds in plastic tubular end portions, particularly PFA, by conduction heating. Moreover, there is a need for reducing cycle time in welding thermoplastics.

When tubular end portions of PFA are heated to beyond their melt point a minimal, although significant, amount of expansion of the molten PFA material occurs. When the tubular end portions being welded are tightly constrained this expansion causes the molten PFA to leach into any crevices or imperfections in the weld head and/or mandrel. Moreover, if the tubular end portions are secured in place after the weld is cooled there will typically be a narrowing of the material at the weld site. This can cause an hourglass shape and/or a reduced wall thickness at the juncture. Where the PFA has leached into minute crevices or imperfections, flashing may exist on the exterior or interior surfaces of the tube when the weld has cooled and is removed from the weld head. These would typically necessitate manual removal and in severe cases may make the welded components unusable in particular applications. Thus, a need exists for minimizing or reducing the currents of flashing, the reduced diameter at the weld juncture, and reduced wall thickness at the weld juncture due to the expansion and contraction of PFA during the weld operation.

SUMMARY OF THE INVENTION

A conduction welding apparatus and method for bonding abutted thermal plastic tubular end portions is particularly suitable for welding PFA. In a preferred embodiment, a folding weld head embraces the abutted the tubular end portions to be welded, each tubular end portion including a flange spaced from the surfaces to be joined. The weld head includes means for securing the flanges within the weld head and further include bias means. The bias means provide an inward axial bias on the adjoined tubular end portions when the tubular end portions are displaced axially outward from the weld head due to the expansion of the plastic during the weld process. The bias means in a preferred embodiment is substantially inoperative prior to the weld and provides bias, or a substantial increase in bias, when the flanges are displaced due to the expansion of the molten PFA during the weld process. In a preferred embodiment, the securing means comprises a pair of clamps which each attach to and encompass the respective tubular end portions at the end portion flanges. The tubing clamps fit into recesses in the weld head. In such a preferred embodiment the bias means is provided by a spring loaded plate which is deflectable in an axial direction outward from the weld head. The invention also includes a process for accomplishing a weld with the described apparatus.

In a preferred embodiment a composite heater portion provides a sharp temperature gradient from the weld juncture outward. The abutted tubular end portions are positioned at a central heated section of relatively narrow thickness in the axial direction with respect to the tubular end portions. The central heated section is preferably formed of two half sections each with a semicylindrical cavity. The two semicylindrical cavities form a cylindrical cavity for embracing the abutted end portions and may be hinged together. Sandwiched around the central heated section are a pair of isolating secondary sections layered adjacent to the central section. The secondary sections will similarly have semicylindrical cavities for receiving the tubular end portions.

The central section is preferably comprised of a material of a substantially higher heat conductivity than the secondary sections. This facilitates rapid heating of the central heated section and slower heating of the secondary sections. The sandwiched sections may be suitably bonded or mechanically secured together. In a preferred embodiment, at least part of the tubing contact portion of the heater portion, such as the isolating secondary sections are comprised of a plastic with high temperature resistance. In a preferred embodiment, the central at the tubing contact portion. Alternatively, ceramic materials may be used at the secondary sections. The central section and outer sections may be of generally the same material with different heat conductive characteristics; for example similar ceramic materials with a large difference in thermal conductivities or may be of very different materials such as copper or stainless steel for the central section and plastic for the secondary sections.

In a preferred embodiment particularly useful for welding PFA, the abutted tubular end portions may be wrapped with an impervious sheet material such as a polyamide film. An object and advantage of the use of the wrap is that the weld head is isolated from the weld without loss of any significant heat transfer to the weld. Thus if the weld head is comprised of any materials susceptible to corrosion from the fluorine gas emitted by the melted PFA, such material are isolated from the gas. Moreover the sheet material operates to prevent the PFA from migrating out of the weld zone, for example, into the junctures of the heater portion layers. A further object and advantage of the use of the sheet material is that the weld has a smooth exterior finish.

The heater head preferably comprises a body with a base portion with a first semicylindrical cavity and a folding portion with a cooperating second semicylindrical cavity to embrace the abutted tubular end portions. A heater portion is secured in each of the respective body portions and is sized to provide snug engagement with the exterior of the tubular end portions to provide heat to the juncture by conduction. The heater head has a pair of slots adjacent to the isolating secondary sections for receiving a pair of clamps which are configured to grasp the tubular end portions to be joined. The clamps are configured to either grasp the exterior cylindrical surface of the tubing portion or a flange that is integral with the tubular end portions of certain fittings/components. The clamps thus provide flexibility of joining flanged tubular end portion to flanged tubular end portion, unflanged portions to flanged portions, and unflanged portions to unflanged portions. Moreover, each of the clamps provide an inward circumferential radial pressure on each of the end portions which is effective to hold the insert in place and maintain the centering within the end portions at the weld juncture during handling, placement in the weld head, and welding. To accomplish a weld the clamps are applied to the tubular end portions to be welded, an insert is placed in the tubular end portions and the end portions with attached clamps are then inserted into the heater head. The clamps are preferably formed of a heat resistant plastic such as a polyetheretherketone (PEEK). Such a material has a very low thermal conductivity and much lower than metals conventionally used in weld heads.

The weld cycle of the weld system is preferably controlled by conventional automated means by a controller. Particularly for welding PFA, in order to minimize environmental effects such as the ambient temperature, the heater element may be initially heated and held to a first temperature below the weld temperature for a period of several minutes, the temperature is then lowered to a lesser amount for several minutes and then is rapidly ramped up to the weld temperature for sufficient time to accomplish the weld. The temperature is then ramped down and the joint and weld head are allowed to cool before removal of the welded component. The minimization of the use of metal in the weld head for the heater portion and the clamps allows the desired temperature to be approached quicker and allows the weld head and weld to cool quicker. The ramping down and holding the power level for several minutes before powering up to the weld temperature appears to allow the weld head temperatures to stabilize sufficiently under varying ambient conditions to provide consistently good welds.

In a preferred embodiment of the invention, several different weld heads which are each configured for a specific tubing size are receivable in a receiver portion on a bench top base. This bench top base has adjustable universal tubing supports that do not require any additional clamping of the tubing members into the support nor do the supports have to be adjusted in any way to provide proper height and alignment of the tubing. Each universal support is spaced from the receiver and the weld head for the bench top base. The various heater heads, each of which is adapted for a specific tubing size, are each placeable in the receiver on the base. Each heater head for a specific size tubing has a configuration to position the lowest portion of the outside diameter of tubing clamped in the head at the same relative elevation as the lowest point on the support surfaces of the universal tubing support.

In a preferred embodiment of the invention, several different weld heads which are each configured for a specific tubing size are receivable in a receiver portion on a bench top base. This bench top base has adjustable universal tubing supports that do not require any additional clamping of the tubing members into the support nor do the supports have to be adjusted in any way to provide proper height and alignment of the tubing. Each universal support is spaced from the receiver and the weld head for the bench top base. The various heater heads, each of which is adapted for a specific tubing size, are each placeable in the receiver on the base. Each heater head for a specific size tubing has a configuration to position the lowest portion of the outside diameter of tubing clamped in the head at the same relative elevation as the lowest point on the support surfaces of the universal tubing support.

Alternatively, inserts which include the heater portion which embraces the tubing to be welded, can be sized for placing the lowest point on the outside diameter of embraced tubing at the same relative elevation as the lowest point on the support surfaces of the universal tubing support.

In a further alternative embodiment, the universal support can have a V-shape such that the supported tubing has two points of contact providing slightly more lateral stability.

Thus, an object and feature of the system is to provide a readily adaptable portable or bench top conduction welding apparatus for various sizes of tubing which requires no adjustable of or mechanical manipulation of the tubing supports when different sizes of tubing are welded.

Another object and advantage of particular embodiments of the invention is that metal to tubing contact is absolutely minimized or eliminated. This facilitates the use of less power per weld, minimizes cycle time, accelerates heating and cooling of the tubular end portions, keeps the exterior of the tubular end portions in better condition, and provides an environment very conductive to welding PFA.

A principal object and advantage of particular embodiments of the invention is that the weld zone is minimized resulting in quicker cycle times.

A feature and advantage of the invention is that the spring-loaded bias is provided only when the tubular end portions expand axially outward.

A further advantage and feature of the invention is that structural anomalies at the weld site such as narrowed wall thickness, flashing, hourglass shape can be minimized or eliminated by the invention.

Further object and advantage of the invention is that the weld head maintains its compact shape while still providing the bias during the weld process.

BRIEF DESCRIPTION OF THE DRAWINGS

FIG. 1 is a perspective view of a weld head in accordance with the invention.

FIG. 2 is a perspective view of a weld head on a bench fixture.

FIG. 3 is a perspective view of a tube clamp in initial engagement with the cylindrical exterior surface of a tubular end portion.

FIG. 3a is an elevational view of a tube clamp.

FIG. 3b is a cross-sectional view taken at line 3b—3b of FIG. 3a illustrating a recess for a flange in the clamp.

FIG. 3c is a cross-sectional view taken at line 3b—3b of FIG. 3a illustrating serrations in the clamp.

FIG. 4 is a tube clamp shown in initial engagement with a flanged tubular end portion of a T-fitting.

FIG. 5 is a perspective view of the tubular end portions and clamps of FIGS. 3 and 4 abutted and with a film wrapped on the juncture. The assembly is ready for insertion into a weld head.

FIG. 6 is a cross-sectional view of a weld head with abutted tubular portions, clamps, and an insert therein.

FIG. 7 is a detailed cross-sectional view showing the interface between the heating portion and the abutted tubular end portions and the juncture.

FIG. 8 is an exploded view of a heater portion half section.

FIG. 8a is a perspective view of a heater portion half section of FIG. 8 assembled.

FIG. 9 is cross-sectional view through the heater portion assembled taken at 9—9 of FIG. 8a.

FIG. 18 is a side elevational view of a further embodiment of a weld head in accordance with the invention.

FIG. 19 is an exploded perspective view of the embodiment of FIG. 18.

FIG. 20 is a cross-sectional view the apparatus of FIG. 18 taken at line 20—20.

FIG. 21 is a detailed figure of a bias means of the embodiments of FIGS. 18–20.

DETAILED SPECIFICATION

Figure 10:
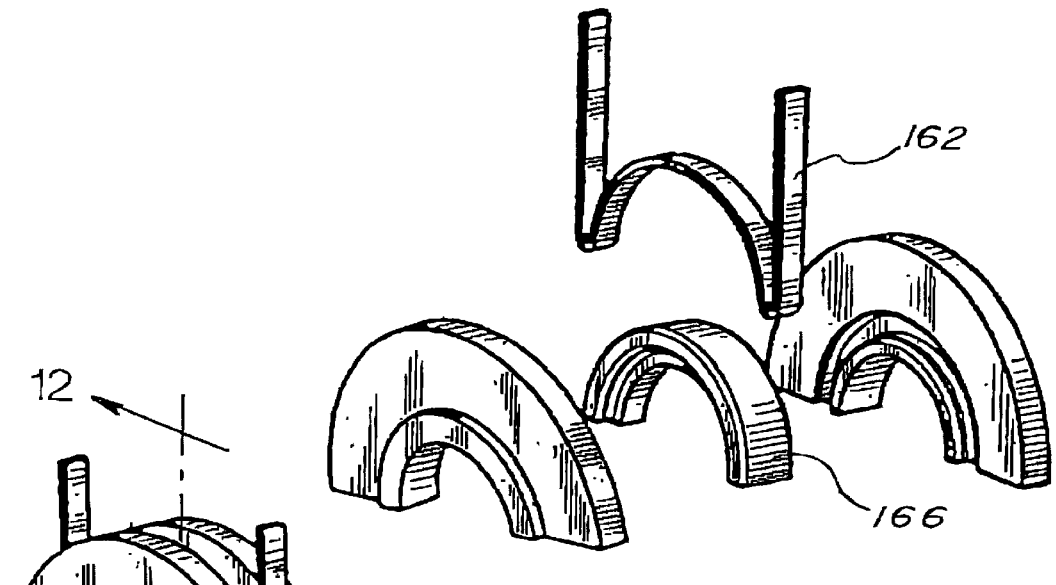
FIG. 10 is an exploded view of an alternate embodiment of a heater portion half section.

Referring to FIGS. 1 and 2, a weld head 22 in isolation and a weld head 22 in place on a receiving region 25 on a bench top base 23 are illustrated. The weld head 22 is comprised principally of a weld head body 24 with two half body sections 26, 28, a heater portion 32 comprised of two heater portion half sections 36, 38, a hinge 40, a toggle latch 42, and a handle 44.

Referring to FIGS. 3 and 4, a pair of tubular end portions are shown partially engaged by tubing clamps 50, 52. FIGS. 3a, 3b and 3c show further details of the clamps. The tubular end portion 55 of FIG. 3 reflects the end of conventional tubing and the tubing clamp 50 utilizes a plurality of circular serrations 58 for gripping the exterior surface 62 of the tubing 64. The clamp has a hinge 65 and a pair of toggle latches 66 for securing the clamp on the tubular end portion. The clamps as shown may suitably be manufactured from polyetheretherketone (PEEK).

Referring to FIGS. 4 and 3b, a tubing clamp is shown which has a recess 70 sized to engage a flange 74 which is integral with the tubular end portions 76 of certain fittings such as the T-fitting 80 as shown in FIG. 4.

FIG. 5 shows the tubular end portions of FIGS. 3 and 4 abutted together with an insert, not visible in this view, placed at the juncture 80 of the abutted end portions. The juncture is covered with a piece of flexible impervious sheet material 84. Said sheet material may be formed in a elongate strip and secured on the tubular end portions by an adhesive such as cyanacrylic adhesive. The strips of flexible impervious sheet material 84 are in one preferred embodiment comprised of Kapton™ film type HN with a thickness of 0.002 inches to 0.005 inches. Kapton is a registered trademark of DuPont Electronics and is a polyamide film. Other types of pervious sheet material that are tolerant to the weld temperatures may also be quite suitable, for example, stainless steel, aluminum, or nickel foils all appear to be suitable for covering the weld juncture if desired.

Referring to FIGS. 5 and 1, the abutted tubular end portion assembly 99 is inserted in the semi-cylindrical cavity 90 and simultaneously the tubing clamps are received in the slots 94, 96. The upper half body section 26 is closed and clamps down upon the abutted end portions. See FIG. 2. The heater head has a power cord 100 with a connector 102 which connects to a control unit 106 which suitably may control the welding process. Referring to FIGS. 2, 3 and 4, the tubular end portion 55 is part of a tubing section 110 which is to be welded to the "T" fitting 80. An adjustable universal tubing support 112 holds the tubing section. The weld head of FIG. 2 is shown hinged away from the handle 49 compared to the alternate configuration of the hinge adjacent the handle in FIG. 1.

Referring to FIG. 6 a cross-sectional view of the weld head and tubular end portions assembly is illustrated along with an insert or mandrel to prevent the creation of an inner bead. Also illustrated is the placement and relationships of the tubing clamps 50, 52 to the weld head as well as the relationship of the heating portion 32 including the central heated section to the tubular end portions and specifically to the juncture 80. The two heater portions half sections 36, 38 are shown in detailed in FIGS. 7 through 9 and comprise central heated section 120 and a pair of secondary isolation sections 124, 126. The heater portion 32 has a cylindrical bore 127 and two axial sides 128, 129. A conventional heater cartridge 130 fits within the recess 132 in the widened portion 134 of each the central heated section. As is evident from FIG. 5 the isolation secondary sections sandwiched are preferably chosen of a material which is of a lower thermal conductivity than the central heated section. This then provides for resistance in the equalization of the temperature of the secondary sections to the central section and thereby creates a sharp temperature gradient and limits the size of the melt zone.

The clamps 50, 52 are illustrated as reflecting inward by way of compressive force in the tubular end portions on each side of the insert 136. This facilitates the proper centering of the insert in the tubular end portion assembly. Moreover, it functions to securely hold the assembly in place.

FIGS. 8, 8a, and 9 illustrate a suitable configuration for a heater portion as also illustrated in FIG. 6.

In an ideal embodiment, the central heated section 120 is comprised of machined cooper and may have a plating 142 of monel or similar material. Cooper has been found to adhere somewhat to the melted PFA and a stainless steel coating or monel is to minimize such adhesion. Ideally the isolating secondary sections may be formed such as by machining of high temperature polymers such polyamide. Vespel™ brand of polyamide available from and manufactured by Boedeker Plastics, Inc. out of Shiner, Tex., is suitable for the secondary sections. Vespel has a thermal conductivity rating of 8.3 BTU-in/ft2-hr-°F.

An alternative suitable material is Celazole™ PBI polybenzimidazole) available from Boedeker Plastics, Inc. of Shiner, Tex. Celazole has thermal conductively ratings of 2.4 and 2.8 BTU-in/ft$^2$(h)in)°F.). This compares to the thermal conductivity of cooper of 2,730 BTU/(ft2)(h)(in) (°F.). These particular plastic materials also provide excellent resistance to sticking to the molten thermoplastics and particularly PBT. Referring to FIG. 7, an illustration of the melt zone 154 is provided. The melt zone is shown centered about the central heated section 120 and extending axially from said heated section to lie adjacent and in contact with the secondary sections 124, 126. The melt zone may vary in size although it has been found that for 1 inch PFA tubing a melt zone of ¼ inch is suitable. The thickness of the heated section at the bore 127 has been found to suitably be 0.015 inches thick measure in the axial direction. The melt zone will extend out to the region adjacent the secondary sections. Conventional conduction heating equipment cannot provide isolation of the heat provided to the juncture and control and limit the melt zone to the degree that is possible utilizing a layered heater portion with optimal selection of materials with the highly differentiated thermal conductivities.

Figure 11:
FIG. 11 is a perspective view of the heater portion half section of FIG. 10 assembled.
Figure 12:
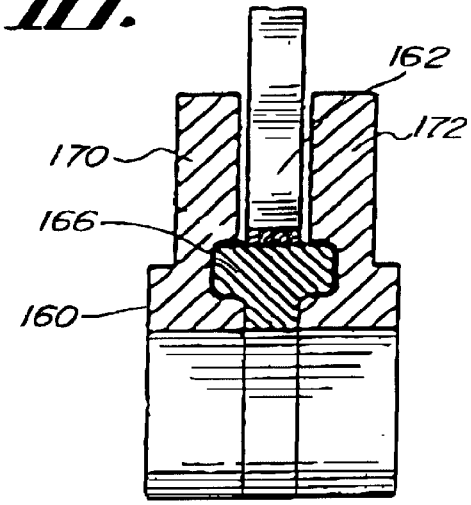
FIG. 12 is cross-sectional view through the heater portion assembled taken at line 12—12 of FIG. 11.

In addition to the use of cooper as the central heated section and high temperature plastics as the secondary sections, other materials are suitable. For example, ceramic materials are available that have relatively low thermal conductivities suitable for the secondary sections and higher thermal conductivities suitable for the central section. Referring to FIGS. 10, 11, and 12, a suitable configuration for such a ceramic heater portion 160 is disclosed. In this case, a heater element could be a stainless steel or other metallic wire 162 which is mechanically or otherwise engaged with the central heated section 166 which has the T-shaped cross-section. This heated section 166 is sandwiched intermediate the secondary sections 170, 172. The ceramic sections can be suitably bounded together to form the single unit as shown in FIGS. 11 and 12. Other materials are usable and which would have the similar advantages as discussed above.

Figure 13:
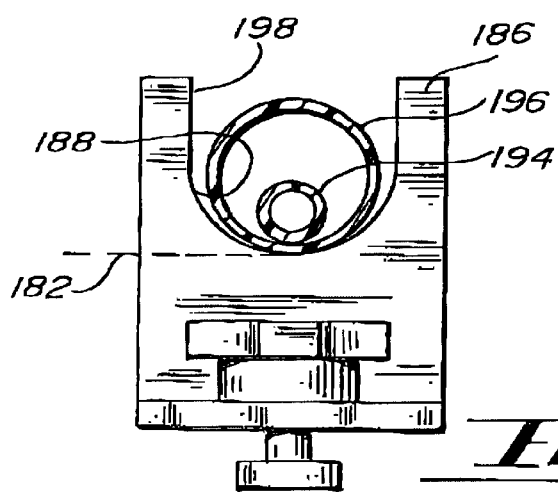
FIG. 13 is an elevational view of a universal tubing support.
Figure 16:
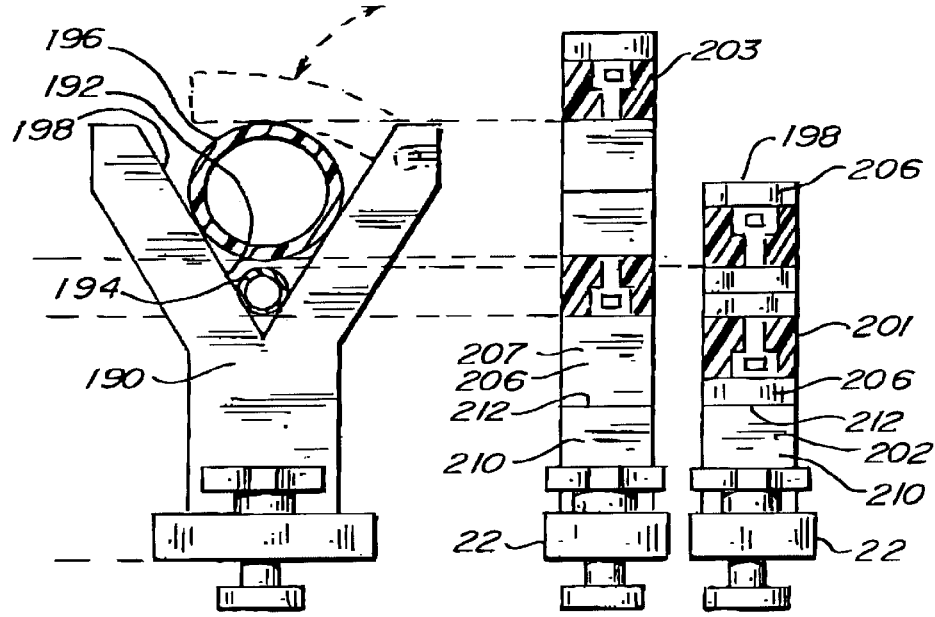
FIG. 16 is an elevational view of a tubing support and cross sectional view of weld heads showing the adaptive datum level concept.

Referring to FIGS. 2, 13, 14, 15, and 16, the aspect of the invention relating to the universal tubing supports and weld heads with tubing datum level adaptation are illustrated. The tubing datum level 182 for differing tubing sizes is either fixed for the tubing support 186 with the U-shaped tubing support surface 188 as illustrated in FIG. 13 or can vary when a tubing support 190 with a V-shaped tubing support surface 192 as illustrated in FIG. 16 is utilized. With the V-shaped support surface the tubing of the first size, the smaller diameter tubing 194, nests farther down in the "V" with a first datum level 195. The tubing of the second size, the larger diameter tubing 196, is higher and defines a second datum level 197. The U-shaped surface the smaller diameter tubing 194 and the larger diameter tubing 196 will have the same datum level 182. Both the U-shaped and V-shaped surfaces have downwardly converging side surfaces 198.

Figures 14, 15:
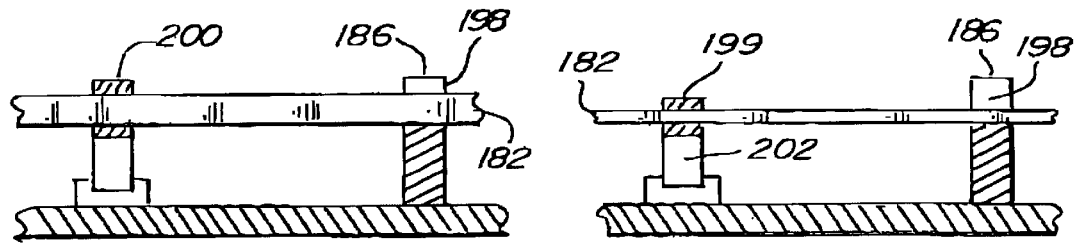
FIG. 14 is a cross-sectional view of a welding apparatus.
FIG. 15 is another cross-sectional view of a welding apparatus.

Referring to FIGS. 14 and 15, a first and second weld heads 199, 200 are shown which are adapted for the first and second tubing sizes respectively and the U-shaped universal tubing support 186. Referring to FIG. 16, first and second weld head upper portions 201, 201, are each adapted, for the first and second tubing sizes respectively and the V-shaped universal tubing support 190. For both the V-shaped support of FIG. 16, and the U-shaped support of FIG. 13, the first weld head 199 or the first weld head upper portion 201, for the first tubing size is adapted to the first datum level, that is, the datum level of the smaller tuber such as by having a shorter base 202 than for the larger tubing size. The second weld head 200 and second weld head upper portion 203 are adapted to the second datum level. Other means of adapting a weld head for a specific tubing size to the appropriate datum level for that tubing size will be apparent to those knowledgeable in the art. FIG. 16 illustrates the weld head lower portion 210 which receives the weld head upper portions 201, 203 at location 212. Such tubing supports 186, 194 and weld head components may suitably formed of aluminum or other materials.

Figure 17:
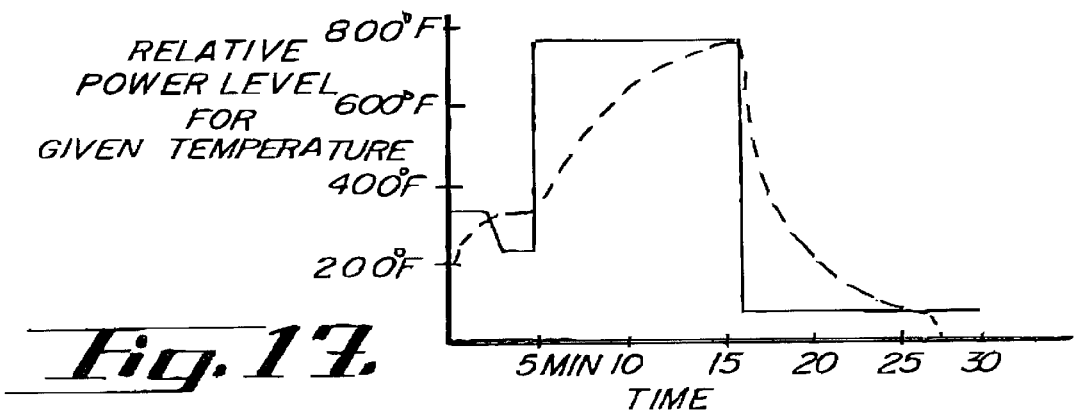
FIG. 17 is a chart showing the relative power levels corresponding to steady state temperatures plotted against time illustrating a weld cycle.

Referring to FIGS. 2 and 17, the weld cycle of the weld system is preferably controlled by conventional automated controller means. Such controllers are well known in the art. The heater element may be a conventional heater cartridge. Particularly for welding PFA, in order to minimize environmental effects such as the ambient temperature, the heater element and heated section is initially powered up with sufficient current to approach a first temperature that is substantially below the weld temperature, for example approximately 350° F. FIG. 17 illustrates a temperature curve corresponding to the power being provided to the heater cartridge. The actual temperature of the heated section will lag behind to reflect the curve of dashed lines. Moreover, the temperature of the heater head body will lag substantially further behind and would due to heat loss would likely never reach the temperature corresponding to a particular power level. Said sufficient power is sustained for a warm up period of approximately two minutes. The temperature is then ramped down to approximately 210° F. for several minutes and then is rapidly ramped up to the weld temperature of approximately 750° F. and is held there for sufficient time to accomplish the weld, perhaps eleven minutes. The temperature is then ramped down to ambient and the joint and weld head are allowed to cool, for perhaps 8 to 10 minutes, before removal of the welded component. These power levels, temperatures, and times have been determined to result in satisfactory welds of PFA.

The minimization of the use of metal in the weld head for the heater portion and the clamps allows the desired temperature to be approached quicker and allows the weld head and weld to cool quicker.

Referring to FIGS. 18–21 a weld head generally indicated with the numeral 224 is illustrated. The weld head 224 has a weld head body 225, a pair of weld head portions configured as weld head halves 228, 230, a pivotal latch 236, a threaded handle 238 which cooperates with a pivotal pin 240 to accomplish the latching and clamping of the two halves of the weld head.

The weld head has recesses 250, 252 for receiving the tubing clamp portions, such as discrete removable clamps as shown in the previous FIGS. 1, 3, and 6. In alternate embodiments, the clamp portions may be generally nonremovable clamp portions affixed to the balance of the weld head. The recesses, the structure defining the recesses, and tubing clamps comprise securing means for gripping the tubular end portions. The structure defining the recess includes outer deflectable plates 260, 262, 264, 266. These deflectable plates are secured in place by a plurality of bolts 266 which are threadably attached to the four plates. The bolts extend through holes 272 in the respective body portions and coiled springs 277 operate to hold the deflectable plates 260 in the initial position shown in FIG. 20. With outward axial pressure provided to the deflectable plates by way of the tubular clamps placed in the recesses said deflectable plates may deflect to the position indicated by the dotted lines labeled with the numeral 280. When the tubular end portions are in their normal position, as shown by the solid lines of FIG. 20, the springs are providing no bias to the abutted tubular end portions. There may be a nominal component of bias provided by positioning of the clamps in the recesses with no deflection. The bias means provided by the springs present a distinct component of bias that takes effect substantially on displacement or deflection of the plates as they extend to the position 280.

At said position the coiled springs are fully compressed and the axial pressure provided on the tubular end portions could be suitably 100 pounds for a 1 inch PFA tubing weld. Such retention provides a high quality weld where the deficiencies of narrowed wall thickness, hour glass shape, and flashing are reduced or eliminated.

Note that as shown the springs are "captured" such that they are providing bias only when further compressed from their captured state. See FIG. 21.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

We claim:

1. A welding apparatus for welding a pair of abutted thermoplastic tubular end portions defining a juncture, each tubular end portion having a cylindrical surface and a circumferential flange extending radially outward from the cylindrical surface, the apparatus comprising a weld head having a body with two half body sections hinged together, and a heating portion for engaging the pair of tubular end portions at the juncture, the apparatus further comprising a pair of discrete circular circumferential clamps for encircling and clamping onto the abutted tubular end portions when the clamps and tubular end portions are not in the weld head, each half body section of the weld head having a pair of slots for receiving the clamps when said clamps are clamped onto the tubular end portions, at least one of the slots being defined by a spring loaded plate that is axially deflectable thereby allowing one of said circumferential clamps to be axially displaced during the weld process, the spring loaded plate providing a bias that increases substantially upon the occurrence of said axial displacement.

2. The welding apparatus of claim 1, wherein the bias is provided by a captured spring.

3. A conduction welding apparatus for welding a pair of abutted thermoplastic tubular end portions, the welding apparatus comprises:

a mandrel for insertion within the abutted thermoplastic tubular end portions, and a weld head comprising a pair of half body sections with a cylindrical bore to receive and embrace the abutted tubular end portions having flanges thereon, circumferential indentations conforming to the flanges defined within the cylindrical bore for securing the flanges within the weld head, and a bias member operably connected to the circumferential indentations for providing an inward axial bias on the adjoined tubular end portions when the tubular end portions are displaced axially outward from the weld head due to expansion of the plastic during the weld process.

4. A conduction welding apparatus for welding a pair of abutted tubular end portions, each end portion having a cylindrical outer surface, the welding apparatus comprising:

a folding weld head with a pair of half body sections, a pair of circumferential slots sized for receiving a pair of tubing clamps, a pair of discrete tubing clamps, each placeable in and separable from one of the slots in the folding weld head, each tubing clamp configured to encircle around an clamp onto one of the tubular end portions when said clamp is separated from the weld head, the weld head further having a biased plate defining one of the slots, the biased plate configured to allow axial expansion of the abutted tubular weld head during the welding process, and a mandrel for insertion in the abutted tubular end portions prior to welding.

5. A conduction welding apparatus for welding a pair of abutted thermoplastic tubular end portions, the welding apparatus comprising:

a mandrel for insertion within the abutted thermoplastic tubular end portions; and a weld head comprising a pair of half body sections with a generally cylindrical bore to receive and embrace the abutted tubular end portions, a pair of circumferential slots and a biased plate wherein the biased plate resists the outward axial displacement of at least one of the slots when the slot is outwardly axially displaced by the expansion of the plastic during the weld process.

6. A conduction welding apparatus for welding a pair of abutted thermoplastic tubular end portions, the welding apparatus comprising:

a mandrel for insertion within the abutted thermoplastic tubular end portions; and a weld head comprising a pair of half body sections with a generally cylindrical bore to receive and embrace the abutted tubular end portions, a pair of circumferential clamps and a pair of slots for receiving the clamps within each half body section of the weld head wherein at least one of the slots is defined by a spring loaded plate that is axially deflectable.

* * * * *